(12) United States Patent
Remschak et al.

(10) Patent No.: US 10,434,452 B2
(45) Date of Patent: Oct. 8, 2019

(54) AIR PURIFICATION PLANT

(71) Applicant: LUWA AIR ENGINEERING AG, Uster (CH)

(72) Inventors: André Remschak, Hittnau (CH); Jürgen Wehner, Wetzikon (CH)

(73) Assignee: LUWA AIR ENGINEERING AG, Uster (CH)

( * ) Notice: Subject to any disclaimer, the term of this patent is extended or adjusted under 35 U.S.C. 154(b) by 220 days.

(21) Appl. No.: 15/528,643

(22) PCT Filed: Dec. 11, 2014

(86) PCT No.: PCT/EP2014/003309
§ 371 (c)(1),
(2) Date: May 22, 2017

(87) PCT Pub. No.: WO2016/091270
PCT Pub. Date: Jun. 16, 2016

(65) Prior Publication Data
US 2017/0266600 A1    Sep. 21, 2017

(51) Int. Cl.
*B01D 46/00*    (2006.01)
*B01D 46/12*    (2006.01)
*D01H 11/00*    (2006.01)

(52) U.S. Cl.
CPC ....... *B01D 46/0065* (2013.01); *B01D 46/002* (2013.01); *B01D 46/125* (2013.01); *D01H 11/005* (2013.01); *B01D 2273/28* (2013.01)

(58) Field of Classification Search
CPC ...... B01D 46/00; B01D 46/0064–0065; B01D 46/002; B01D 46/125; D01H 11/005; D01H 11/006
USPC ...... 55/284–287, 294, 296–299; 96/417–423
See application file for complete search history.

(56) References Cited

U.S. PATENT DOCUMENTS 5,507,851 A  *  4/1996  Kennington ....... B01D 46/0058
                                                              55/284

* cited by examiner

*Primary Examiner* — T. Bennett McKenzie
(74) *Attorney, Agent, or Firm* — Oliff PLC (57) ABSTRACT

An air purification plant, having a partition wall for the spatial separation of a dirty-air space, which is disposed upstream, from a clean-air space, which is disposed downstream, which partition wall has a support frame and a plurality of filter boxes which project from the support frame in the direction of the dirty-air space, and the filter boxes have at least one filter wall which extends from the support frame into the dirty-air space. The filter boxes are in each case open only in the clean-air space which is disposed downstream, wherein filter walls, which face one another, of adjacent filter boxes in each case form a filter pocket which is open on the upstream side and at the bottom, and for switching from one filter pocket into an adjacent filter pocket a suction nozzle is moved through below the filter box which separates the two filter pockets.

15 Claims, 7 Drawing Sheets

AIR PURIFICATION PLANT

TECHNICAL FIELD

The present disclosure relates to an air purification plant.

BACKGROUND

The employment of air purification plants is of great importance particularly in the textile industry, since large amounts of dust and fluff are released into the air in the course of manufacturing textile products. This has a significant negative influence on the quality of the manufactured textile product when such contaminants are deposited on the textile yarn. For this reason, filtration plants are usually employed in textile manufacturing facilities, in order to free the air from dust and material particles carried therein. Such filtration installations usually fill rooms and have filter walls which are meters high, having filter mats which are passed though by the air to be purified. In this manner, the dust and fiber particles carried in the dirty air are separated at the filter mats. However, the amount of deposits of separated particles, which increases in the course of the service life of the air purification device, goes hand-in-hand with a decrease in the permeability of the filters. In order for a constant filtration performance to be able to be ensured, the filter faces must therefore be cleaned at regular intervals or freed from deposited dust and fiber materials. Known cleaning possibilities include, for instance, back-washing or reverse-flow blowing, scraping, beating or suctioning the filter faces.

For example, DE 3 527 656 A1 discloses a scraper which for cleaning the filter face is moved up and down along the surface of the latter, so as to scrape off the particles which are deposited on the filter face and to convey said particles into a receiving space which lies therebelow.

However, such scrapers haven proven to be disadvantageous for air purification plants in the textile industry, as on account of electrostatic charging the fibers carried in the air stream increasingly build up to form comparatively large accumulations—so-called fiber plaits. These fiber plaits often cling to the scraper, severely hindering the ability of the latter to function.

For this reason, suction devices which are moved along the filter faces are increasingly employed in the textile industry for suctioning off the deposited contaminants from the filter faces.

For instance, DE 3830991 discloses a filtration device which has a trap device having a plurality of V-shaped niches which are effective in filtration. In order to clean the niches, the suction nose of a suction element which is fastened on a support is introduced into a niche on the front side and moved up and down in said niche. Each niche is either assigned one dedicated suction element, or one suction element handles cleaning of a plurality of niches and upon cleaning-down of a niche is reversed therefrom, moved laterally in a horizontal manner outside the trap device to a next niche and inserted into the next niche with the suction nose leading. For cleaning the niches and for switching from one niche to another, the suction elements or their supports, respectively, are thus moved in three spatial directions—namely up and down in the vertical direction within the niches; back and forth in the horizontal direction, and laterally to and fro. Not only constructively complex designs but also complicated drive and control systems are required in order to be able to implement such multidimensional movement profiles. Moreover, a lot of space is required outside the filter niches of the trap device for maneuvering the suction element from one niche to the next.

A further problem in the context of suction installations in air purification plants lies in that excessive fiber and dust accumulation arises over time in particular at points which are not or only poorly accessible to the suction nozzles, which may lead to congestion and thus to blockage of the suction nozzle.

SUMMARY

It is thus an object of the disclosed embodiments to provide an air purification plant which is simplified in terms of its construction and control system and which offers an improved or greater ratio, respectively, of filtration capacity to space requirement, which is modestly susceptible to failure, and which permits reliable cleaning of the filters during operation.

This object is achieved by an air purification plant disclosed herein. Preferred embodiments are the subject matter of the dependent claims.

The air purification plant has a partition wall which is provided for the spatial separation of a dirty-air space, which is disposed upstream, from a clean-air space, which is disposed downstream. The terms "upstream" and "downstream" in the present application consistently relate to the direction of the air stream which flows from sides of the dirty-air space through filtration-active portions of the partition wall into the clean-air space.

The partition wall comprises a support frame and a plurality of filter boxes which project from the support frame in the direction of the dirty-air space. Said filter boxes have in each case at least one, preferably two, filter wall or filter walls, respectively, which extend from the support frame into the dirty-air space, and are open in the clean-air space which is disposed downstream. Preferably, the filter boxes are open only on the rear side, that is to say in the clean-air space, while upstream they are delimited by filter box walls (including the at least one filter wall) and at the top and on the base by an upper or lower tight cover, respectively.

The filter walls comprise in each case one filter face which is permeable to air. With the exception of these filter faces, the dirty-air space is typically separated from the clean-air space in a sealing manner, which is to say in a manner impermeable to air, by the partition wall. On account of the partition wall, air from the dirty-air space may thus only make its way through the filter faces of the filter walls into the clean-air space. In the simplest case, the dirty-air space and the clean-air space are disposed in a common box which is positioned on a floor space which is continuous or at least in part configured as a (mesh) grill. In this case, the support frame of the partition wall preferably defines the outer circumference of the partition wall and in its width and height corresponds to the width and height of the box. In this manner the support frame can be mounted in a perpendicular manner on the floor area, on account of which said support frame is delimited at the lower side by the floor area, at the upper side by the ceiling, and on both sides by the side walls of the box.

In the case of the air purification plant according to a preferred embodiment, air laden with dust and fibers is guided through the filter walls into the clean-air space, wherein the dust and fiber materials carried along are separated at the filter walls. In this context "guided" means that an air flow is produced on account of a pressure differential between the dirty-air space and the clean-air space, for example. To this end, for example, the clean-air space may be connected to a negative-pressure source, for example a fan.

According to the preferred embodiment the filter boxes are disposed on the support frame of the partition wall in such a manner that filter walls, which face one another, of adjacent filter boxes in each case form a filter pocket. Here, a filter pocket extends in the vertical direction from the lower end to the upper end of the filter boxes. Owing to the formation of filter pockets, the face which is effective in filtration is significantly greater than this would be in the case of a single planar filter wall. According to the preferred embodiment, the filter pockets are open on the upstream side—that is to say in the direction of the dirty-air space— and at the base, while on the downstream side—that is to say in the direction of the clean-air space—they are delimited by the filter walls of adjacent filter boxes and optionally by the support frame. Particularly preferably, the filter pockets are open not only on the upstream side and at the base but also at the top.

In the sense of the preferred embodiment, the filter walls serve for purifying the air, which means that they are at least at points permeable to air. Such filter walls are adequately known to the person skilled in the art and typically have passages which are covered with a filter material. The filter material may be, for example, a metallic or textile fabric (in particular a non-woven fabric) or another air-permeable substrate which is effective in filtration on which on the upstream side the contaminants, such as fibers or similar, which are separated from the air to be filtered are separated.

According to a particularly preferred embodiment the filter walls comprise an outer, self-supporting frame which, optionally, is additionally reinforced using connecting braces. In comparison to the otherwise usual support from expanded metal, such a frame construction as a support for the substrate which is effective in filtration has the advantage that the usable net filter face can be increased.

Furthermore, the air purification plant comprises a filter cleaning installation having a horizontal rail on which a carriage is guided so as to be movable to and fro in the horizontal direction, and a vertical rail which is fastened on the carriage and on which, for cleaning down the filter walls of a respective filter pocket, a suction nozzle is guided so as to be movable up and down in the vertical direction. The filter cleaning installation is typically disposed in the dirty-air space.

The horizontal rail normally extends parallel to the support frame, and the vertical rail is normally disposed on the upstream side of the partition wall or the filter boxes, respectively. Proceeding from the vertical rail, the suction nozzle with its free end protrudes into a filter pocket and at the opposite other end is typically connected to a negative-pressure source via a flexible air exhaust line, for example an exhaust pipe. For cleaning the filter walls of a respective filter pocket the suction nozzle has a suction opening through which fiber material and dust which have been separated at the filter walls can be suctioned off.

In comparison to known devices from the prior art, the advantage of the air purification plant according to the preferred embodiment lies in particular therein that a filter wall, in particular also a non-planar filter wall, can be cleaned down with a single suction nozzle and the suction nozzle to this end is moved only in two spatial dimensions. This is achieved according to an embodiment in that the filter pockets which are in each case formed by filter walls, which face one another, of adjacent filter boxes are not only open on the upstream side but also at the bottom. The terms "bottom" and "top" here refer to the air purification device in the erected state. On account of the filter pockets which are open at the bottom it is possible that, for switching from one filter pocket into an adjacent filter pocket, the suction nozzle is moved through below the filter box which separates the two filter pockets. In other words, the suction nozzle is moved downward within one filter pocket until said suction nozzle is situated outside the filter pocket and can be moved through below the filter box lying therebetween from the one filter pocket into an adjacent filter pocket.

Owing to the solution according to the preferred embodiment the suction nozzle can be moved from one filter pocket into an adjacent filter pocket without having to be reversed (that is to say in the upstream direction) out of the filter pockets for this purpose, as according to DE 3830991, for instance. This has the advantageous effect of not requiring additional space on the upstream side of the filter boxes for running out the suction nozzle and thus enabling the employment of filter boxes having a larger longitudinal extent, i.e. filter boxes which extend far into the dirty-air space, without having to increase the dimensions of the dirty-air space to this end.

The preferred embodiment thus provides an air purification plant having a larger effective filter surface and thus a larger filter capacity, without demanding additional space in comparison to plants from the prior art. Moreover, the air purification plant according to this embodiment enables cost-effective and efficient cleaning of the entire filter wall face by means of a single suction nozzle.

The air purification plant according to the preferred embodiment simultaneously permits cleaning down of the filter faces during operation. This means that the air purification plant does not have to be switched off during the cleaning operation of the filter pockets. This renders the air purification plant particularly suitable for use in the industrial processing of textile materials, since the continuous removal of contaminants, such as fiber fly and similar, which continuously build up on the filter walls is of great importance for trouble-free processing.

A further advantage of the this embodiment lies therein that in the course of the switching filter pockets with suction nozzle the floor area under the filter boxes can simultaneously be cleaned. This prevents dust and fiber material which has been separated at the filter walls from accumulating on the floor and congestion and/or blockages of the suction nozzles arising on account thereof.

In order for the movement of the suction nozzle below the filter box or the filter boxes, respectively, to not be hindered when switching filter pockets, said filter boxes are preferably exclusively held by the support frame. This means that no additional support elements for the filter boxes are present except for the support frame, and that on the upstream side of the support frame and below the filter boxes a free lower intermediate space in which the suction nozzle can be moved is situated.

In order for the suction nozzle to be able to clean down the filter walls across their entire height, the suction nozzle or its suction opening, respectively, has to be moved at least to the upper end of the filter walls. Therefore, a free upper intermediate space is also particularly preferably situated between the upper delimitation of the dirty-air space (typically the ceiling of the box) and a horizontal plane which is defined by the upper end of the filter boxes, in order for the suction nozzle to be able to be optionally moved in the vertical direction beyond the height of the filter box. Moreover, the free upper intermediate space permits an arrangement of the horizontal rail on the ceiling side. Here, not only the actual horizontal rail but also the carriage which is guided along the horizontal rail and the upper end of the vertical rail are preferably situated in the free upper intermediate space upstream of the filter boxes.

In the sense of simplified control the suction nozzle, preferably when switching filter pockets, is merely movable in a vertical manner in the extension of the filter pockets and below the filter boxes in a parallel manner to the horizontal rail. While in the prior art the suction nozzle had to perform movements in three spatial directions for switching filter pockets, namely vertically (z-direction), horizontally counter to the direction of the air stream for running out the suction nozzle from the filter pockets (y-direction), and horizontally along the filter wall (x-direction), the movement of the suction nozzle in the case of the air purification plant according to the preferred embodiment can be limited to two spatial directions, namely the z-direction and the x-direction.

According to one preferred embodiment the support frame comprises a floor strip which adjoins the filter boxes on the lower side and which defines a floor plane from which floor plane the filter boxes are spaced in the vertical direction. (The floor plane typically runs in the plane of the floor area). On account of the suction nozzle being moved according to the preferred embodiment through below the filter boxes for the filter switching, it is evident that the height of the lower intermediate space between the filter boxes and the floor plane, or the spacing between the filter boxes and the floor plane, respectively, is ideally greater than the vertical dimension of the suction nozzle. Particularly preferably the floor strip of the support frame directly adjoins the filter boxes on the lower side, such that the maximum spacing between the filter boxes and the floor plane at least approximately corresponds to the height of the floor strip.

In place of a support frame having a floor strip which adjoins the filter boxes on the lower side, the air purification plant may however also be positioned on a floor area which below the filter boxes has a depression or a floor opening which continues through the height of the floor area, in order for the suction nozzle to be able to be moved through below the filter boxes for performing the switching of filter pockets. Since in this case no floor area is present directly below the filter boxes, the floor cleaning function of the suction nozzle is dispensed with in the case of this embodiment.

According to a particularly preferred embodiment a floor air duct is provided below the dirty-air space, in particular adjoining the floor area directly therebelow, which floor air duct is connected to the dirty-air space via an air supply opening in the floor area. The floor air duct serves for supplying dirty air, for instance from an adjoining machine room, into the dirty-air space, enabling a particularly space-saving arrangement of the air purification plant in an industrial operation.

Particularly preferably the dirty-air space and the floor air duct are merely separated by the floor area. In this manner, the dirty air may make its way from the floor air duct into the dirty-air space via one or more openings in the floor area. The air supply opening here is formed by one or more openings (for example in the form of a floor grating) in the floor area.

Particularly preferably the air supply opening is at least in part formed by a floor opening below the filter boxes. In this case the floor opening permits not only a maneuvering space of the suction nozzle below the filter boxes for performing switching of filter pockets but also simultaneously as a connection point to the floor air duct. Moreover, this has the advantage that comparatively large accumulations of dust and textile fibers, which on account of gravity drop from the filter walls, accumulate in the floor air duct and can be removed from there directly via the floor air duct from the air filter plant in the course of periodically performed cleaning. In this manner congestion of the suction nozzle is counteracted, in turn significantly reducing the susceptibility to failure of the filter cleaning installation.

As far as the design of the suction nozzle is concerned, the latter is typically configured as a hollow body and preferably has a preferably at least approximately planar nozzle base and two nozzle side walls which project in a preferably at least perpendicular manner from the nozzle base and which in each case have one suction opening which is adjacent to the nozzle base. A suction opening which is adjacent to the nozzle base is particularly advantageous for cleaning the floor below the filter boxes.

In order to be able to clean the entire filter face as far as possible, the length of the suction nozzle corresponds to at least about the depth of the filter pockets. Moreover, the suction opening preferably extends across the entire length of the nozzle side wall. Particularly preferably the suction opening is configured in a slotted manner or as a row of holes and directed onto the surface of the filter wall, in order to achieve a suction effect which is as strong and precise as possible.

In one preferred embodiment the suction nozzle comprises two nozzle chambers which communicate with a respective nozzle opening. In the case of this embodiment a switchover installation is also present, by means of which a setting may be made as to whether in each case only one nozzle chamber is operational in an alternating manner on the suction nozzle, or whether both nozzle chambers are simultaneously utilized. In the event that both nozzle chambers are operational, the suction nozzle as a double suction nozzle may simultaneously clean both filter walls of a filter pocket. In the event that only one nozzle chamber is impinged with suction air, only the filter wall which faces the active nozzle chamber may indeed be cleaned, however at double the suction effect. In this manner, for example, first the one filter wall may be cleaned down during the upward movement of the suction nozzle in a filter pocket, and once the suction nozzle has reached the upper end filter pocket the suction air supply is switched over, on account of which the other nozzle chamber is impinged with suction air and the other filter wall of the filter pocket is cleaned in this manner during the subsequent downward movement of the suction nozzle.

It should be noted at this point that the suction nozzle in a respective filter pocket may also be moved up and down multiple times in succession in order to increase the cleaning effect—irrespective of whether said suction nozzle has two nozzle chambers or only one central nozzle chamber and whether or not both suction openings are simultaneously impinged with suction air.

The filter boxes, when viewed in the plan view, have an external shape which is rectangular or which tapers toward the upstream side, in particular which is triangular or trapezoidal. Moreover, the external shape or the horizontal cross-sectional area of the filter boxes preferably remains constant across the entire height of the filter boxes.

Considering that the filter pockets are in each case formed by filter walls, which face one another, of adjacent filter boxes, the filter pockets preferably have a horizontal cross section which is rectangular or which tapers toward the downstream side, in particular which is triangular or trapezoidal.

Since the suction force which acts on the filter wall surface rapidly decreases as the spacing of the suction opening from the filter wall surface increases, the external shape of the suction nozzle (in the plan view) is preferably at least approximately adapted to that of the filter pockets. Particularly preferably the external shape of the suction nozzle (in the plan view) thus corresponds to that of the filter pockets and the suction nozzle in the horizontal cross section is preferably only slightly smaller than the horizontal cross section of the filter pockets.

Particularly preferably the suction nozzle has a rather flat shape, that is to say a modest vertical extent. This has the advantage that only a slight spacing between the floor area and the lower side of the filter boxes is required, in order to be able to move the suction nozzle through below the filter boxes for switching filter pockets.

According to one preferred embodiment, the filter boxes are individually replaceable on the support frame and preferably have a robust filter box frame on which the assigned filter walls are held. In this manner the filter boxes and/or the filter walls can be individually removed and replaced, if and when required. Moreover, if and when required, the filter boxes which are disposed on the support frame so as to be closer to the center and which are thus often more heavily stressed can be replaced in this manner earlier than the peripheral filter boxes which are typically less heavily stressed.

Particularly preferably all filter boxes have a uniform shape, since this facilitates the construction and in particular the replacement of individual filter boxes or filter walls. In the event that all filter boxes are identically configured, they typically have at least two filter walls which, proceeding from the support frame, protrude into the dirty-air space. However, in the case of the peripheral filter boxes only one filter wall, namely that filter wall which is disposed so as to be farther inside on the support frame, is part of a filter pocket, while the other, outer filter wall faces the side wall of the dirty-air space and thus cannot be part of a filter pocket in the sense of the present application, that is to say part of a filter pocket which is effective in filtration on both sides. In order for no dust and fiber particles to accumulate in the space between the side wall of the dirty-air space and the outermost filter wall of a peripheral filter box, the outermost filter wall either bears in a sealing manner on the side wall or the space on the upstream side is covered in an air-tight manner using a front cover.

As far as the arrangement of the filter boxes on the support frame of the air purification plant is concerned, two or more filter boxes may be optionally disposed on top of one another in the vertical direction. An arrangement of the filter boxes stacked on top of one another on the one hand has the advantage that the face of the air purification plant which is active in filtration can be adapted to the external conditions—the room height, for example—and on the other hand that, on account of the lower weight and the smaller size, shipping and erecting of the individual filter boxes is significantly simplified.

In the following sections, preferred drive and control variants of the suction nozzle movement are discussed in more detail.

According to one preferred embodiment the suction nozzle is connected to an endless traction member, for example a chain, a timing belt or belt, which in an upper and lower end region of the vertical rail is in each case guided about a deflection roller. The vertical rail is assigned a vertical drive which is preferably fastened on the carriage and which drives one of the deflection rollers, preferably the upper one.

The traction member is preferably equipped with one or two switch actuation element(s) which define(s) the upper or lower end position, respectively, of the suction nozzle in its upward and downward movement (or up and down movement) within a filer bag. As soon as the suction nozzle reaches the upper or lower end position, a limit switch is actuated by means of the (respective) switch actuation element, which limit switch initiates a changeover of the drive direction in the vertical drive. In particular, two limit switches and one switch actuation element may be provided, or instead only one limit switch and instead two switch actuation elements. In the case of two limit switches, the latter may be positioned, for example, so as to be level with the lower or upper end position of the suction nozzle, respectively. The switch actuation element in this case may be fastened on the traction member so as to be level with the suction nozzle, or on the actual suction nozzle, and may actuate the respective switch as soon as the suction nozzle reaches an end position. In the case of one limit switch, two switch actuation elements are typically present, which are fastened on the traction member at a spacing which corresponds to the distance between the lower and upper end position.

For instance, a reversing electric motor which is preferably controlled by way of inductive, mechanical or light-sensory limit switches may be employed as a vertical drive. Drives which are controlled by limit switches are adequately known to the person skilled in the art. For example, mechanical switches having a spring contact, inductive switches (position sensors) or light barriers are employed as limit switches.

The movement of the suction nozzle below the filter boxes from one filter pocket into the next preferably takes place by moving the carriage having the vertical rail fastened thereon along the horizontal rail. Particularly preferably, the carriage is moved by means of a drive, for instance of a gear motor and/or an electric motor, along the horizontal rail. The drive is preferably disposed on the carriage and permits at least one carriage wheel to be reversibly driven. Control of the gear motor and/or the electric motor likewise preferably takes place by way of inductive, mechanical or light-sensory limit switches.

In the case of one preferred embodiment, the drive speed of the carriage in the horizontal direction and the drive speed of the suction nozzle in the vertical direction for the cleaning operation of the filter wall are individually adjustable. For example, the vertical movement of the suction nozzle is preferably faster than the horizontal movement of the carriage.

In order to define the path which has to be covered by the suction nozzle when switching filter pockets between two adjacent filter pockets, the horizontal rail is preferably assigned an encoding rail which has one encoding element, preferably a clearance, for each filter pocket. In the case of this embodiment the carriage has a sensor element (for example, a non-contacting inductive position sensor, a mechanical switch, or a light barrier), which upon identification of an encoding element serves for stopping the movement of the carriage along the horizontal rail and preferably for initiating the vertical movement of the suction nozzle.

According to a particularly preferred embodiment, the air purification plant comprises a control unit which is preferably disposed on the carriage and which, proceeding from a first filter pocket, controls the following movement pattern for the suction nozzle:

a) activating the vertical drive in order to move the suction nozzle in a filter pocket along the vertical movement path from a lower end position into an upper end position and back again;

b) activating the horizontal drive in order to move forward the suction nozzle upon its return to the lower end position, below the filter box lying therebetween into an adjacent filter pocket;

c) repeating steps a) and b) until a last filter pocket is reached;

d) activating the vertical drive in order to move the suction nozzle in the last filter pocket along the vertical movement path from a lower end position into an upper end position and back again, e) activating the horizontal drive in order to move back the suction nozzle upon its return to the lower end position, below all filter boxes lying therebetween, into the first filter pocket.

BRIEF DESCRIPTION OF THE DRAWINGS

Embodiments of the invention are described in more detail in the following with reference to the figures. In the figures, in a purely schematic manner.

DETAILED DESCRIPTION

Figure 1:
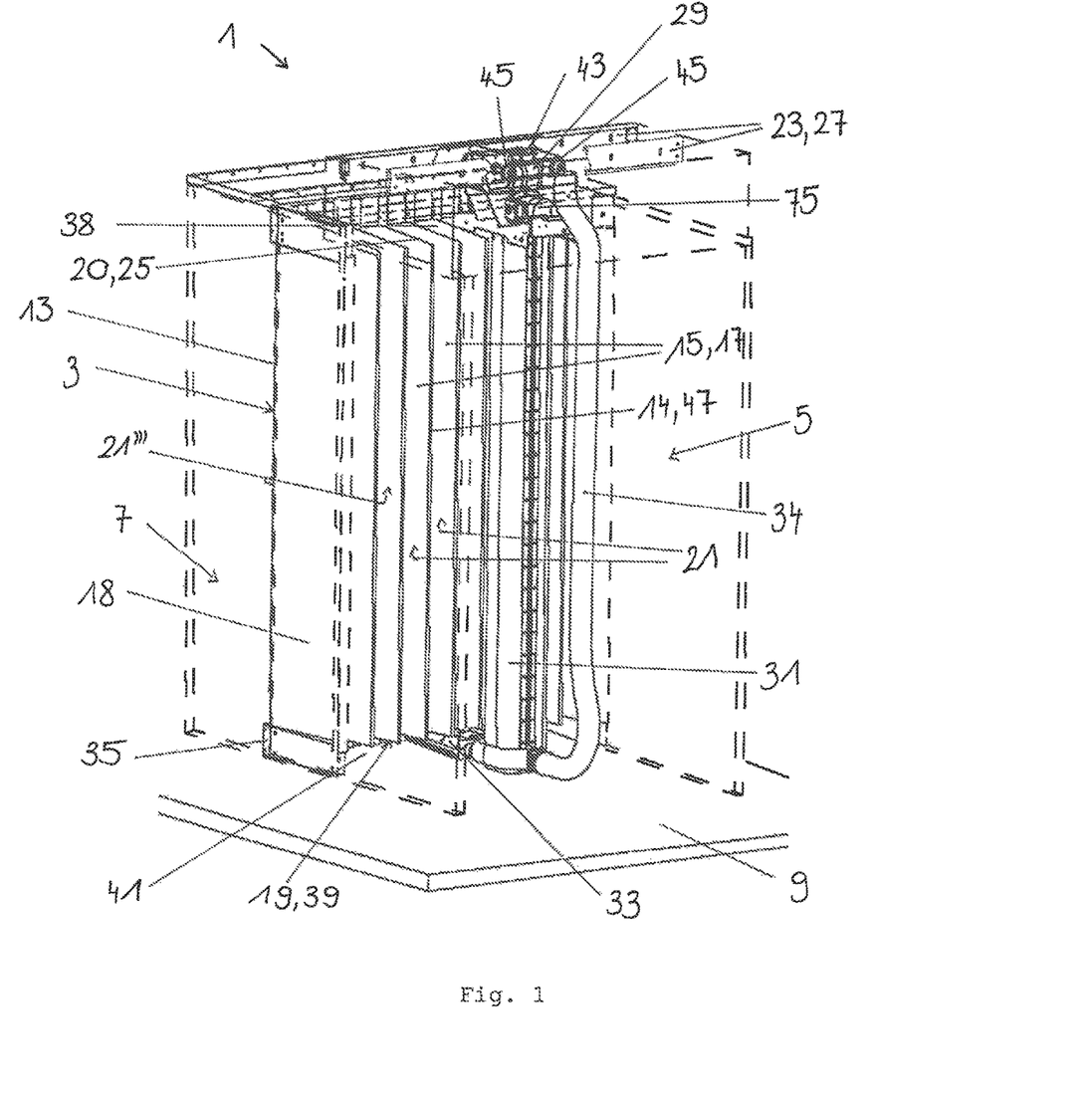
FIG. 1 shows, in a perspective view, an embodiment of an air purification plant having a plurality of filter boxes which are held on a support frame and in each case have two filter walls, and a filter cleaning installation comprising a suction nozzle for cleaning the filter walls.

The air purification plant 1 which is illustrated in a perspective manner in FIG. 1 serves for separating contaminants from the air, in particular textile contaminants from the exhaust air of industrial textile manufacturing or textile processing operations. In such operations, the air typically has to be cleaned of dust and fiber fly continuously (fiber fragments, textile remnants, fiber tufts, etc.) which are created when operating textile machinery, spinning machinery, weaving or knitting machinery.

The air purification plant 1 has a partition wall 3 which spatially separates a dirty-air space 5, which is disposed upstream, from a clean-air space 7, which is disposed downstream, whereby with the exception of a floor area 9, the delimiting faces (side walls and ceiling) of the spaces are only indicated by dashed lines. As has already been mentioned at the outset, the terms "upstream" and "downstream" consistently refer to the direction of the air stream which flows from sides of the dirty-air space 5 into the clean-air space 7 through portions of the partition wall 3 which are active in filtration.

The air to be purified is suctioned from a machine room of a textile processing plant, for example, and flows through an air supply opening (not shown) into the dirty-air space 5, is then purified by the air purification plant 1, and subsequently makes its way into the clean-air space 7, from where the purified air can again be released into the machine room or optionally to the environment. The air to be purified may be conveyed in a known way and manner (for instance, by air conveying means which are not shown, such as a fan, a blower, or similar) in the flow direction from the dirty-air space 5 in the direction of the clean-air space 7 (downstream).

Figure 3:
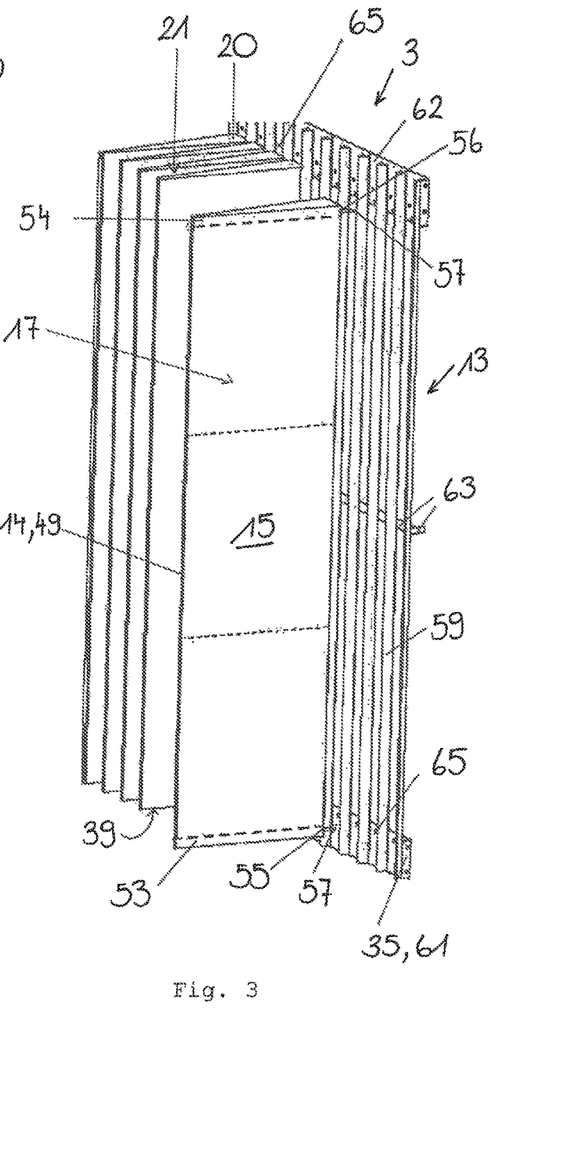
FIG. 3 shows, in a perspective view, the support frame of FIG. 1, having filter boxes fastened thereon, and a filter box which has not yet been erected.

The partition wall 3 comprises a support frame 13 on which a plurality of filter boxes 17 which project from the support frame 13 in the direction of the dirty-air space 5 are held, in particular onto which they are screwed (see FIG. 3). Said filter boxes 17 are disposed in a row behind one another on the support frame 13, and have in each case two planar filter box walls 15 which extend from the support frame 13 into the dirty-air space 5 and merge on the upstream side on a vertical edge 14 (see also FIG. 3). Said filter box walls 15, which in the plan view extend along the legs of an isosceles triangle (see also FIG. 7), in the case of the shown embodiment simultaneously comprise the faces which are effective in filtration and are henceforth referred to as "filter walls" 15. Upstream of the support frame 13 the filter boxes 17 are thus delimited by the filter walls 15. Moreover, the filter boxes 17 are closed off in an air-tight manner at the top and bottom by a floor plate 19 and a ceiling plate 20, respectively. However, in the region of the actual support frame 13, the filter boxes 17 are open, i.e. on the support frame 13 they open into the clean-air space 7 which is disposed downstream.

A filter pocket 21, which in contrast to the filter boxes 17 is merely delimited downstream by the filter walls 15 and is open on the upstream side and at the bottom and top, respectively, is formed by two adjacent filter walls 15 of adjacent filter boxes 17 which in each case face each other.

The air purification plant 1 further comprises a horizontal rail 23 which is disposed above a horizontal plane which is defined by the upper end 25 of the filter boxes 17 and extends parallel to the longitudinal direction of the support frame 13. The horizontal rail 23 comprises two guide rails 27 which are disposed so as to be parallel with one another and along which a carriage 29 is guided so as to be movable to and fro in the horizontal direction (see FIG. 7). Moreover, a vertical rail 31 which is disposed on the upstream side of the partition wall 3 or the filter boxes 17, respectively, is fastened on the carriage 29. In the event of the carriage 29 being moved along the horizontal rail 23, the vertical rail 31 which is fastened on the carriage 29 thus also conjointly moves with the latter.

A suction nozzle 33 is guided on the vertical rail 31, which suction nozzle 33, connected via an exhaust air hose 34 to a negative pressure source (not shown), for cleaning down the filter walls 15 of a filter pocket 21 is moved up and down in the vertical direction in the respective filter pocket 21. To this extent, the suction nozzle 33 may either perform vertical reciprocating movements along the vertical rail 31 or by movement of the carriage 29 be moved together with the vertical rail 31 along the horizontal rail 23 in the horizontal direction.

In the case of the shown embodiment the support frame 13 having the filter boxes 17 fastened thereon is positioned on a floor area 9, and said support frame 13 has a floor strip 35 which on the lower side adjoins the filter boxes 17 and, on the other hand, the floor area 9. The filter boxes 17 and their filter walls 15, respectively, in the case of the shown embodiment are exclusively held by the support frame 13 and are not in contact with the floor area 9. This means, that except for the support frame 13, no additional support elements for the filter boxes 17 are present on the floor side (as is also visible in FIG. 3). The lower side 39 of the filter boxes 17 is thus spaced from the floor area 9 in the vertical direction, whereby this floor spacing corresponds to about the height of the floor strip 35. The function of this arrangement of the filter boxes 17 which is spaced from the floor area 9 in the vertical direction is explained in the following.

FIG. 1 shows the suction nozzle 33 in a lower end position in which the former is situated below the filter boxes 17, or in the free lower intermediate space 41, respectively (see also FIG. 4) between the floor area 9 and the lower side 39 of the filter boxes 17. The vertical dimension of the nozzle is smaller than the spacing of the filter boxes 17 from the floor area 9, or the height of the floor strip 35, respectively, and also much smaller than the vertical dimension (height) of the filter walls 15. Since the filter pockets 21 are open to the bottom, for switching from one filter pocket 21 into an adjacent filter pocket 21" the suction nozzle 33 can be moved through below the filter box 17 which separates the two filter pockets 21, 21". (In as far as no mention is made of a specific filter pocket, the filter pockets are assigned the general reference sign 21). The suction nozzle 33 is thus movable below all filter boxes 17 which are flanked on either side by filter pockets. Once the suction nozzle 33 in the course of such a switching of filter pockets is moved in the free lower intermediate space 41, the floor area 9 under the filter boxes 17 can be simultaneously cleaned. This prevents dust and fiber material which has been separated on the filter walls 15 from accumulating on the floor area 9 and, on account thereof, from congestion and/or blockages of the suction nozzle 33 being able to arise. Moreover, separate cleaning of the floor area 9, for example using an additional vacuum, can be dispensed with, permitting a significant time saving in the air purification process.

In the sense of an embodiment the suction nozzle 33 in each individual filter pocket 21 is moved up and down in the vertical direction at least once, whereby, as mentioned above, the suction nozzle 33, after cleaning down one filter pocket 21, for example the first filter pocket 21', is in each case moved below a filter box 17 lying therebetween from said first filter pocket 21' into the adjacent filter pocket 21". Following cleaning of the last filter pocket 21'" to be cleaned, the suction nozzle 33 is returned below all filter boxes 17 which are flanked on either side by filter pockets 21 up to an initial position 103 (see FIG. 10) in which the suction nozzle 33 is situated directly below the first filter pocket 21', and the cleaning process may commence again at the first filter pocket 21'. On account of the horizontal and vertical movement of the suction nozzle 33, the entire filter face and the floor area lying therebeneath can be completely cleaned during one cleaning cycle.

The movement of the suction nozzle 33 below the filter boxes 17 from one filter pocket 21 into the next one takes place by moving the carriage 29 having the vertical rail 31 fastened thereon along the horizontal rail 23. Driving the carriage 29 along the horizontal rail 23 takes place by means of a horizontal drive 43, for example of a gear motor and/or an electric motor, which is fastened on the carriage 29 and drives at least one carriage wheel 45, preferably two carriage wheels 45 or all four carriage wheels 45 in a reversing manner.

The carriage 29, including the vertical rail 31, is in each case moved onward along the horizontal rail 23 by the distance between two adjacent filter pockets 21, and is then stopped in order for the suction nozzle 33 to subsequently be moved up and down at least once within a filter pocket 21. Control of the upward and downward movement of the suction nozzle 33 along the vertical rail 31 and of the horizontal movement of the carriage 29 or the suction nozzle 33, respectively, along the horizontal rail 23 is explained in more detail further below in the context of FIG. 7.

Figure 2:
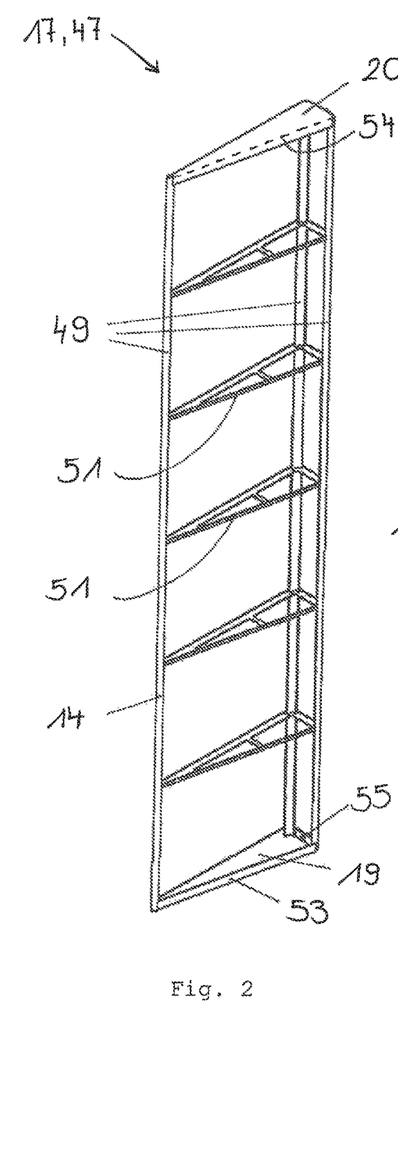
FIG. 2 shows, in a perspective view, a filter box frame of a single V-shaped filter box.

As can be seen from FIG. 2, each filter box 17 comprises a self-supporting filter box frame 47 which is formed by the following elements: the floor plate 19 and the ceiling plate 20, three vertical braces 49, and a plurality of horizontal braces 51. The floor plate 19 and the ceiling plate 20 have in each case a congruent, triangular base area and are spaced apart from one another in the vertical direction and are disposed so as to be parallel to each other. The corner points of the two plates are in each case connected by way of the vertical braces 49. The horizontal cross section of a filter box 17 thus corresponds to the base area of the floor plate or ceiling plate 19 or 20, respectively, which in the embodiment illustrated corresponds to an isosceles triangle. The base of the isosceles triangle here defines the rear side of the filter box 17, while the two legs define the sides of the filter box 17. In order to increase the stability of the filter box frame 47, the vertical braces 49 are interconnected by means of the horizontal braces 51, whereby in each case three horizontal braces 51 are disposed in one plane and thus project an isosceles triangle which is congruent in relation to the floor or ceiling plate 20.

The floor plate and ceiling plate 19 and 20 have a floor strip and ceiling strip 53 and 54, respectively, which, proceeding from the edges of the floor plate or ceiling plate 19 or 20, respectively, extend in a substantially perpendicular manner to the respective plate along the vertical braces 49. On the rear side of the filter box 17 the floor strip and ceiling strip 53, 54 in each case have one continuous through bore 55, 56 through which a threaded pin 57 can be inserted, in order to fasten the filter boxes 17 by way of their rear side on the support frame 13 of the partition wall 3 (see FIG. 3).

Part of the support frame 13 having some filter boxes 17 fastened thereon is shown in isolation in FIG. 3. In reality, the support frame 13 is delimited at the bottom by the floor area 9, at the top by a ceiling, and on either side by side walls of the air purification plant 1, the latter three items not being shown for reasons of improved clarity, however.

The support frame 13 comprises a plurality of vertical supports 59 which are disposed in a row and which in each case are fastened on the lower end on a lower longitudinal support 61 on the floor side and at the upper end on an upper longitudinal support 62 on the ceiling side. For stabilizing, the vertical supports 59 are additionally interconnected via a horizontal center brace 63 at mid height. The upper and lower longitudinal support 61, 62 have in each case a row of holes 65, whereby the number of holes 65 is chosen such that in each case one hole 65 is present mid-way between two adjacent vertical supports 59. Thus one hole 65 is provided between two adjacent vertical supports in the lower and in the upper longitudinal support 61, 62, and the distance between these two holes 65 corresponds to the distance between the through bores 55, 56 in the upper and lower floor strips 53, 54 of a filter box 17. In the event that the filter box 17 is brought to bear with its rear side on the longitudinal supports 61, 62 of the support frame 13, the through bores 55, 56 in the floor strip 53 or the ceiling strip 54, respectively, may be superimposed on the holes 65 in the longitudinal supports 61, 62.

For fastening the filter boxes 17 on the support frame 13 in each case one fastening screw having a threaded pin 57 is inserted through the through bores 55, 56, such that the screw head (not visible) is situated on the side of the floor strip 53 or the ceiling strip 54, respectively, which faces the interior of the box. The projecting threaded pins of the fastening screw are visible in the case of the frontmost filter box 17 which has not yet been erected. Said threaded pins 57 are then guided through the holes 65 in the upper or lower longitudinal support 62 or 61, respectively, and on the rear side (on the downstream side) fixed on the support frame 13, using a nut which is not visible. In the state as erected in this manner the filter box 17 having on its rear side the floor strip 53 or ceiling strip 54, respectively, bears in a sealing manner on the lower or upper longitudinal support 61, 62, respectively, and on either side is additionally flanked on the support frame 13 by a respective vertical support 59. The spacing between two adjacent vertical beams 59 substantially corresponds to the width of the rear side of the filter box 17, i.e. the length of the base of the triangular horizontal cross section of the filter box 17. On account thereof it is ensured that the partition wall 3 which is formed by the support frame 13 and the filter boxes 17 fastened thereon is permeable to air substantially only at the filter walls 15. As shown in FIG. 3, the lower longitudinal support 61 may also form the floor strip 35.

The filter boxes 17 are thus individually fastened on the support frame 13 and are also individually replaceable. This has the advantage that an individual filter box 17 which is damaged can be readily replaced, for instance. Since the filter boxes 17 are spaced from the floor area 9 (or the lower end of the support frame 13, respectively) and also from the ceiling (or the upper end of the support frame 13, respectively), they can be erected or individually replaced in a particularly simple manner. The filter boxes 17 which are disposed in the region of the center are often more heavily stressed than the peripheral filter boxes 18 (see FIG. 7). In this manner, the inboard filter boxes 18 may be replaced more frequently than the peripheral filter boxes 18, and may optionally also be configured in a different manner with respect to the pore size, the mesh size, or the material of the filter material.

The filter walls 15 may also be constructed from a plurality of filter boxes 17 of the same type, which are disposed on top of one another in the vertical direction and interconnected (indicated using dashed lines in FIG. 3).

In the case of the shown embodiment the filter walls 15 comprise an outer frame on which a material which is effective in filtration, in particular a non-woven filter medium, is held. The non-woven filter medium is fastened on the lower side 39 or a lower periphery of the filter box 17, respectively, and tensioned in an upward manner across the entire surface of the filter wall 15. In particular in the case of large-area filter walls, the outer frame parts may optionally be connected by way of additional braces, in order to offer an additional bearing face for the non-woven filter medium. The non-woven filter medium is configured in a sufficiently fine-pored manner in order to retain matter, fibers or particles of a predetermined size. The outer faces of the filter walls 15 thus form the dirty-air side.

Figure 4:
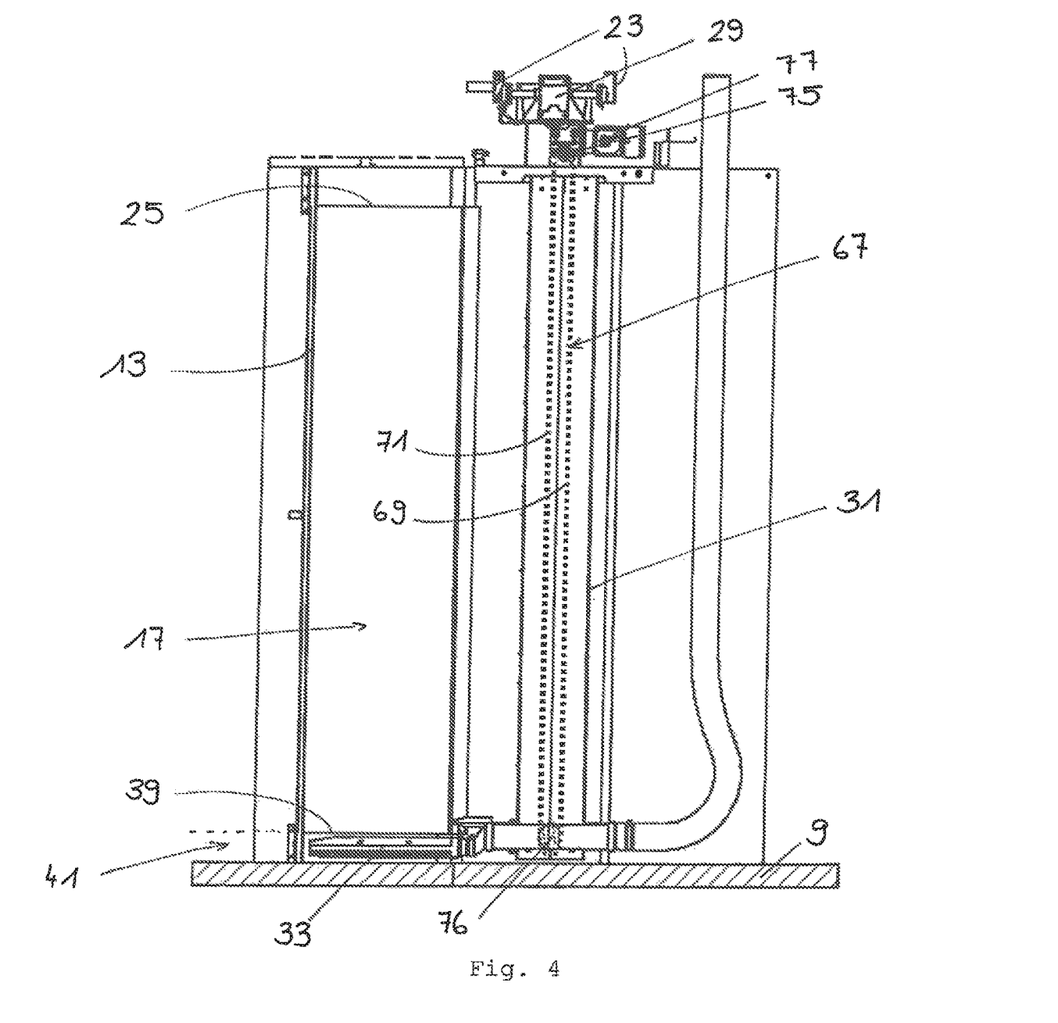
FIG. 4 shows the air purification plant of FIG. 1, in a side view.

FIG. 4 shows the air purification plant 1 illustrated in FIG. 1, in a side view. The suction nozzle 33 is connected to an endless traction member 67 (indicated using dashed lines) which is disposed within the vertical rail 31 and which serves for moving the suction nozzle 33 up and down and which has a front leader 71 and a rear leader 69. The section nozzle 33 is fastened on the front leader 71, while a limit switch actuation element 73 is fixed on the rear leader 69 (see FIG. 5).

The endless traction member 67 in an upper and lower end region of the vertical rail 31 is in each case guided about one upper and lower deflection roller 75, 76, respectively, whereby the upper deflection roller 75, in the vertical direction, is disposed lower down than the horizontal rail 23 and higher up than the upper end 25 of the filter boxes 17. The lower deflection roller 76 (see also FIG. 5), about level with the floor strip 35, is thus positioned somewhat lower down than the lower side 39 of the filter boxes 17. By driving the upper deflection roller 75, the traction member and the suction nozzle 33, which is connected to the traction member 67, are moved. In the present case, the upper deflection roller 75 is driven by way of a vertical drive 77, in particular a reversing electric motor, which is fastened on the carriage 29 and is controlled by way of limit switches. In the shown embodiment, inductive non-contacting limit switches 79 are used for controlling (see FIG. 5); however, light-sensory or mechanical limit switches could also be readily employed.

It should be mentioned at this point that instead of the traction member 67 and vertical rail 31 another type of reciprocating drive may also be used, of course, for example by connecting the suction nozzle to a running nut, and the running nut moves along a threaded spindle which is fastened on the carriage in a vertically disposed manner and is able to be driven in a reversing manner in both rotational directions by a motor.

Figure 5:
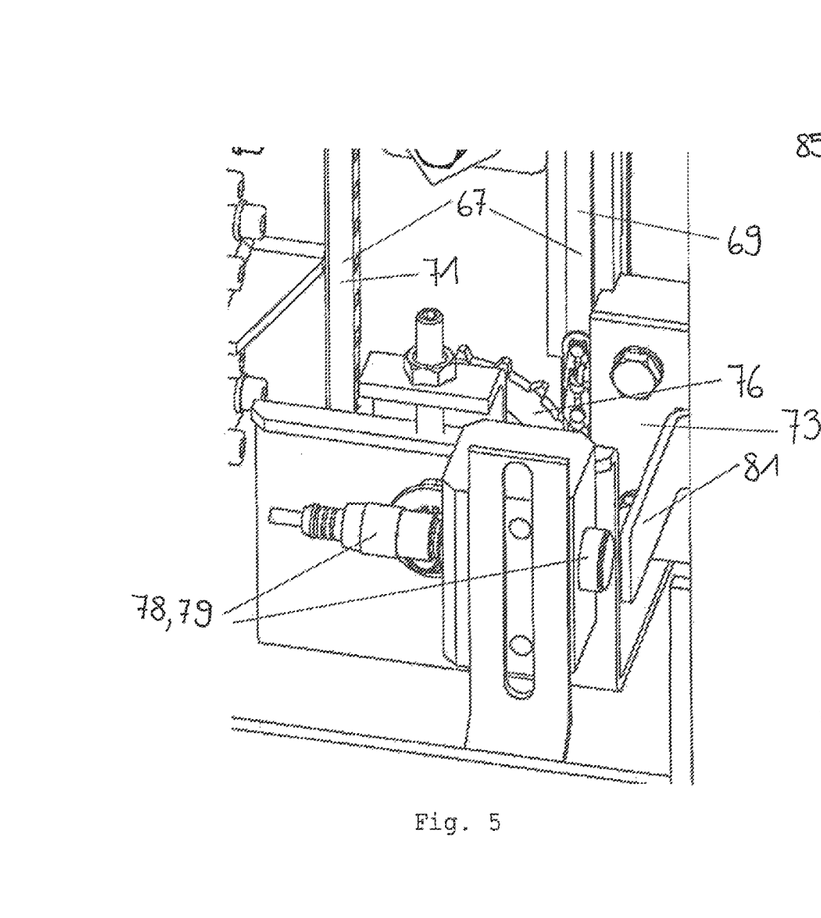
FIG. 5 shows, in an enlarged illustration, a lower limit switch having an inductive position sensor for controlling the vertical movement of the suction nozzle.

In FIG. 5 the lower deflection roller 76 and a lower inductive limit switch 78 are illustrated in an enlarged manner. The inductive limit switch 78 comprises a metallic limit switch actuation element 73 which is fastened on the traction member 67, and an inductive position sensor 79. The limit switch actuation element 73 is fastened on the traction member 67 (see FIG. 4) or on the rear leader 69 thereof, respectively, and serves for defining the upper and lower end position, respectively, of the suction nozzle 33 in its upward and downward movement within a filter pocket. The suction nozzle 33 is connected to the front leader 71, meaning that the suction nozzle 33 and the limit switch actuation element 73 move in mutually opposite directions. For example, during an upward stroke the upper deflection roller is driven in the counterclockwise direction by the vertical drive 77 (a servomotor, for instance), and the suction nozzle 33 which is fastened on the front leader 71 is moved upward, while the rear leader 69 having the limit switch actuation element 73 fastened thereon moves downward.

The limit switch actuation element 73 has a metallic (electrically conductive) actuation arm 81 which at the end of an upward stroke of the suction nozzle 33 is detected by the lower position sensor 79 and at the end of a downward stroke is detected by an upper inductive position sensor (not shown). The snapshot illustrated in FIG. 5 shows the position of the limit switch actuation element 73 at the end of an upward stroke movement of the suction nozzle 33, at which point in time the actuation arm 81 is situated level with the lower position sensor 79. At this point in time the suction nozzle 33 has therefore reached the upper end position 38, and the metallic actuation arm 81 is identified or detected, respectively, by the lower position sensor 79. Detection of the metallic actuation arm 81 by the position sensor 79 takes place in an inductive and non-contacting manner, whereupon the position sensor 79 emits a signal to the vertical drive 77, in order to initiate a changeover of the drive direction for the vertical drive 77. In the present case, the vertical drive 77 thereupon would drive the upper deflection roller 75 therefore in the clockwise direction, and the suction nozzle 33 would be moved downward.

Instead of an inductive non-contacting limit switch, of course other limit switches, for example optical or mechanical limit switches, may also be applied.

Once the suction nozzle 33 reaches the lower end position 37, the upper position sensor (not shown) which is disposed in the region of the upper deflection roller 75 is actuated by the limit switch actuation element 73. Actuation of the upper limit switch, however, not only initiates a changeover of the drive direction, but additionally causes a brief switching-off or pausing, respectively, of the vertical drive 77, namely for as long as it takes for the suction nozzle 33 to complete the switch from the current filter pocket 21 into the next filter pocket 21" (see FIG. 6). After having finished switching filter pockets below the filter boxes 17, the vertical drive 77 is activated again, however it is subjected to a reversal of direction, that is to say counter to the previous drive direction (see FIG. 11).

Figure 6:
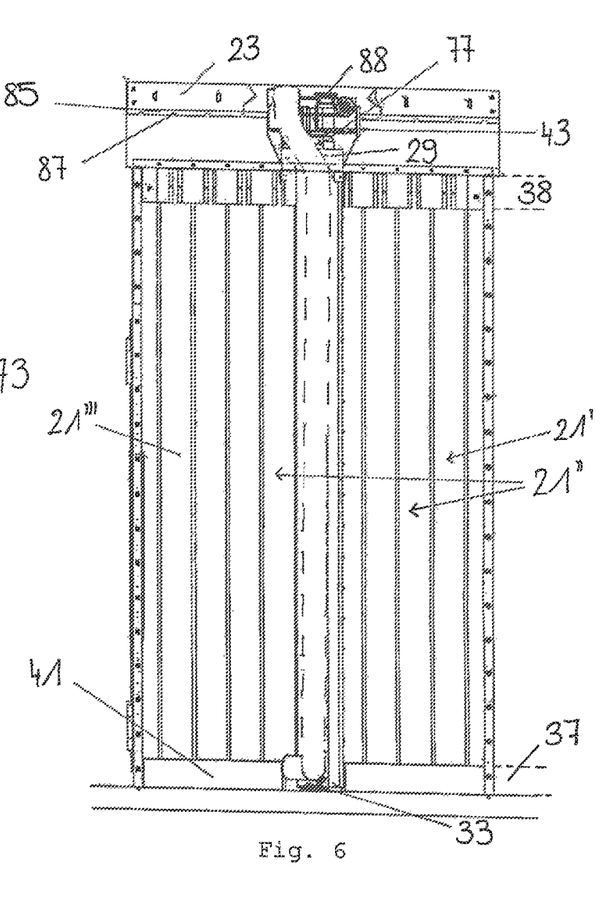
FIG. 6 shows, in a front view, the air purification plant shown in FIG. 1.

FIG. 6 shows a front view, looking in the direction of flow toward the partition wall 3. In order to define the path between two adjacent filter pockets 21 to be covered by the suction nozzle 33 when switching filter pockets, the horizontal rail 23 is assigned an encoding rail 85 which has one encoding element 87 in the form of a clearance for each filter pocket 21. The carriage 29 has a sensor 88 which serves for stopping the horizontal drive 43 when a coding element 87 is identified and for initiating thereupon the vertical movement of the suction nozzle 33. While the carriage 29 is moved along the horizontal rail 23, the sensor 88 continuously, i.e. in an inductive, mechanical or light-sensory manner, scans the encoding rail 85. As soon as the sensor 88 detects an encoding element 87—in the present case a clearance—a stop signal is sent to the horizontal drive 43 and an activating signal is sent to the vertical drive 77 (the drives 43 and 77 are more clearly evident in FIG. 7).

There are various options for the specific design of the sensor 88 and the encoding element 85. Besides the shown variant, acquiring the position of the carriage may also take place by means of inductive or optical circuits, for instance.

Identification of the encoding element 87 by the sensor typically takes place shortly before the carriage 29 reaches the desired stop position, in order to account for the inertia of the carriage 29. Since the vertical drive 77 is to be activated only after the carriage 29 has reached the stop position, the signal to the vertical drive 77 is emitted either only shortly after the stop signal has been emitted, or the vertical drive 77 is controlled such that it is activated only after a certain temporal delay after receipt of the activating signal.

At the height of the first and last filter pockets 21', 21''', the horizontal drive 23 moreover has in each case one inductive, mechanical or light-sensory limit switch (not shown), the actuation of which or the identification by which initiates the reversing of the carriage 29 to the initial position. Either the same sensor which detects the encoding elements 87 along the encoding rail 85 may be used for identifying the limit switch, or a separate sensor which specifically serves for identifying the limit switch may be used.

Figure 7:
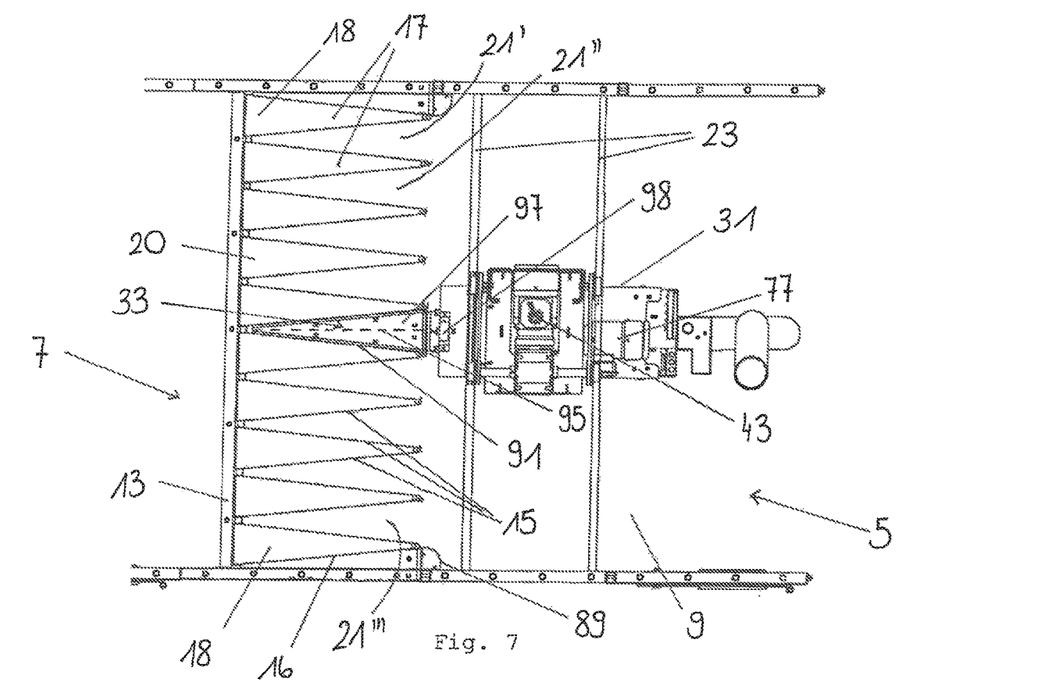
FIG. 7 shows, in a plan view, the air purification plant shown in FIG. 1.

As is readily evident from FIG. 7, in the plan view the filter boxes in the shown embodiment 17 have a cross section in the shape of an isosceles triangle, whereby the two legs are formed by filter walls 15 which, proceeding from the support frame 13 of the partition wall 3, extend into the dirty-air space 5.

The filter boxes 17 are fastened on the support frame 13 in such a manner that the partition wall 3, in the plan view and in the horizontal cross section, has a zigzag profile. In the plan view, each two adjacent filter walls 15 are disposed in a V-shape in relation to one another, whereby the tip of the "V" upstream of the support frame 13 is formed by a vertical edge 14, and the two filter walls 15 enclose an angle of about 30° at the vertical edge 14. This zigzag arrangement has the advantage that the surface which is effective in filtration is significantly enlarged in relation to a single planar partition wall 3 which is disposed in the support frame 13.

As mentioned above, the filter boxes 17 are in each case open only on the rear side, i.e. in the direction of the clean-air space 7, while at the top and the bottom they are delimited by the upper and lower cover 20 or 19, respectively (not visible in FIG. 7). In the shown embodiment all filter boxes 17 have a uniform shape, facilitating the construction and in particular the replacement of the filter boxes 17 or of individual filter walls 15. Each filter box 17 comprises two filter walls 15 which, proceeding from the support frame 13, protrude into the dirty-air space 5, whereby, however, in the case of the peripheral filter boxes 18 only one filter wall 15, namely the filter wall 15 which is disposed farther inboard on the support frame 13 is part of a filter pocket 21. The other, outermost filter wall 16 of the peripheral filter boxes 18, however, faces the side wall of the dirty-air space 5 and thus cannot form a filter pocket 21 which is effective in filtration on both sides. In order for no dust and fiber particles to accumulate in the space between the side wall of the dirty-air space 5 and the outermost filter wall 16 of a peripheral filter box 18, this space on the upstream side is covered in an air-tight manner using a front cover 89.

On the front side, i.e. on the upstream side of the filter boxes 17, the vertical rail 31 is disposed, and proceeding from the vertical rail 31, the suction nozzle 33 extends downstream in the direction of the support frame 13. The suction nozzle 33, on its end at the upstream side, is thus guided on the vertical rail 31 so as to be movable upward and downward and here, on the downstream side, protrudes into the central fifth filter pocket 21. In particular, the suction nozzle 33 has two longitudinal nozzle side walls 91 which merge toward one another in the downstream direction and which face the filter walls 15 of the filter pocket 21. With respect to its external shape (when viewed in the plan view), the suction nozzle 33 is adapted to the external shape of the horizontal cross section of the filter pockets 21. In the case of the illustrated embodiment the external shape of the suction nozzle 33 (in the plan view), thus corresponding to the filter pockets 21, likewise corresponds to an isosceles triangle, whereby the horizontal cross-sectional area of the suction nozzle 33 is only slightly smaller than that of the filter pockets 21. On account thereof, it is ensured that the air sucked in by the suction nozzle 33 as far as possible only suctions the filter face and the amount of leaked air can be kept as small as possible.

By means of the drive mechanism described above in the context of FIG. 4 the suction nozzle 33 can be moved along the vertical rail 31 in a vertical manner up and down within the filter pocket 21, whereby the nozzle side walls 91 move in a parallel manner in relation to the two filter walls 15 which form the filter pocket 21. Along both longitudinal sides the suction nozzle 33 has in each case one suction opening 93 (see FIG. 8), through which the dust and fiber particles which have been separated at the filter walls 15 on the dirty-air side can be suctioned. Owing to the suction openings 93 on both sides, both filter walls 15 of the filter pockets 21 can be simultaneously cleaned.

Figure 8:
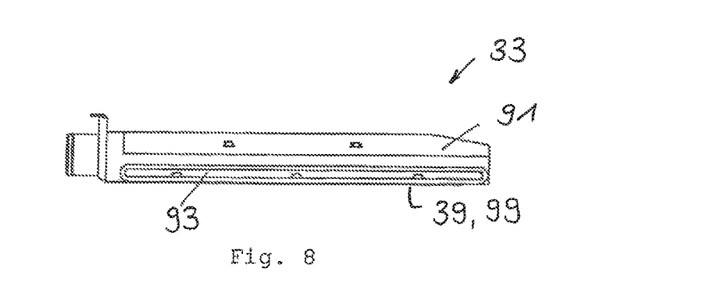
FIG. 8 shows, in a side view, an embodiment of a suction nozzle.

It should be mentioned at this point that it is, of course, also possible for the suction nozzle 33 to be configured in such a manner that in the event of a vertical movement within a filter pocket 21 in each case only one filter wall is cleaned. To this end, the interior of the suction nozzle 33 would be subdivided by a vertical longitudinal center wall 95 (indicated by dashed lines) into two separate chambers 97, for example, whereby each chamber 97 is assigned one suction opening 93. The suction openings 93 are constantly open; however, only one chamber 97 is in each case impinged with suction air. The supply of the suction air into the one or the other chamber 97 or into both chambers 97 may be controlled simultaneously in a known manner by means of a switchover installation 98, for example a shut-off flap. In the event that only one chamber 97 is alternatingly provided with suction air in each case, in comparison to the variant described above this has the advantage that the suction performance delivered by the negative pressure source and thus the volume of suction air is halved, or in the case of the suction performance remaining the same, the suction effect can be doubled.

As shown in FIG. 8, the suction openings 93 on the longitudinal sides of the suction nozzle 33 are configured in a slotted manner and substantially extend across the entire length of the nozzle side walls 91, in order to be able to clean the filter walls 15 across the entire width of the latter without having to move the suction nozzle 33 in a horizontal manner for this purpose. In order to be able to effectively free the filter walls 15 and also the floor area of fiber material and dust, the suction openings 93 in the two nozzle side walls are disposed close to the lower side of the nozzle, or adjacent to the nozzle base 99, respectively.

Instead of one suction slot per side wall, a plurality of rows of suction slots or suction holes may also be present, of course. However, in comparison to a row of suction holes, a slotted suction opening has the advantage that also more unwieldy textile contaminants, such as fabric remnants or similar, can be sucked in therethrough without any problem.

Figure 9:
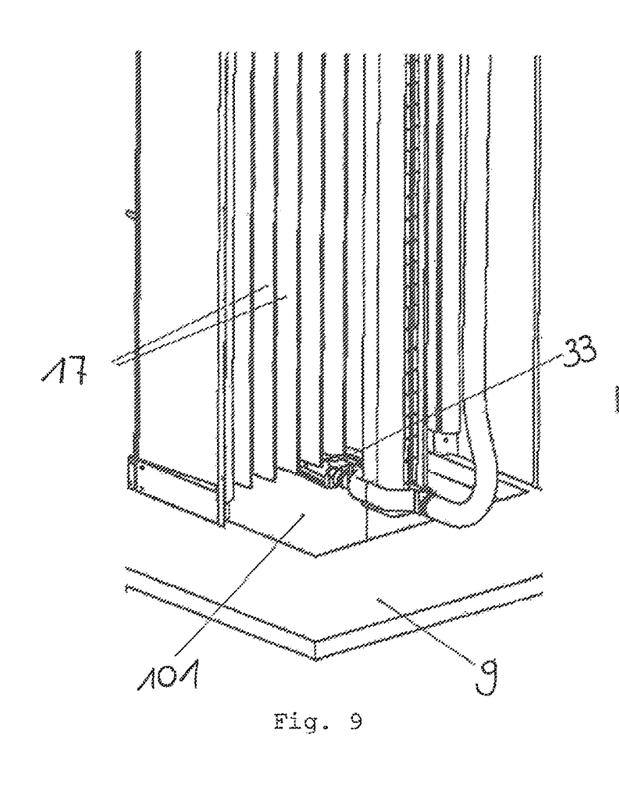
FIG. 9 shows, in a perspective view, a further embodiment of an air purification plant having an open floor.

As illustrated in FIG. 9, the air purification plant 1 may also have no floor strip 35 or one which is reduced and on the lower side adjoins the filter boxes 17, and instead be positioned on a floor area 9 which below the filter boxes 17 has a floor opening 101—whereby theoretically also merely a depression in the floor could be provided in place of the floor opening. In said floor opening 101 the suction nozzle may be moved through below the filter boxes 17 for performing switching of filter pockets in the sense of a preferred embodiment. Since no floor area 9 is present directly below the filter boxes 17, the floor cleaning function of the suction nozzle 33 is dispensed with in this embodiment. Instead, owing to the floor opening 101, dust and textile fibers falling off the filter walls may be directly removed from the air filter plant, additionally reducing the susceptibility to failure of the suction nozzle on account of fiber accumulations.

Figure 10:
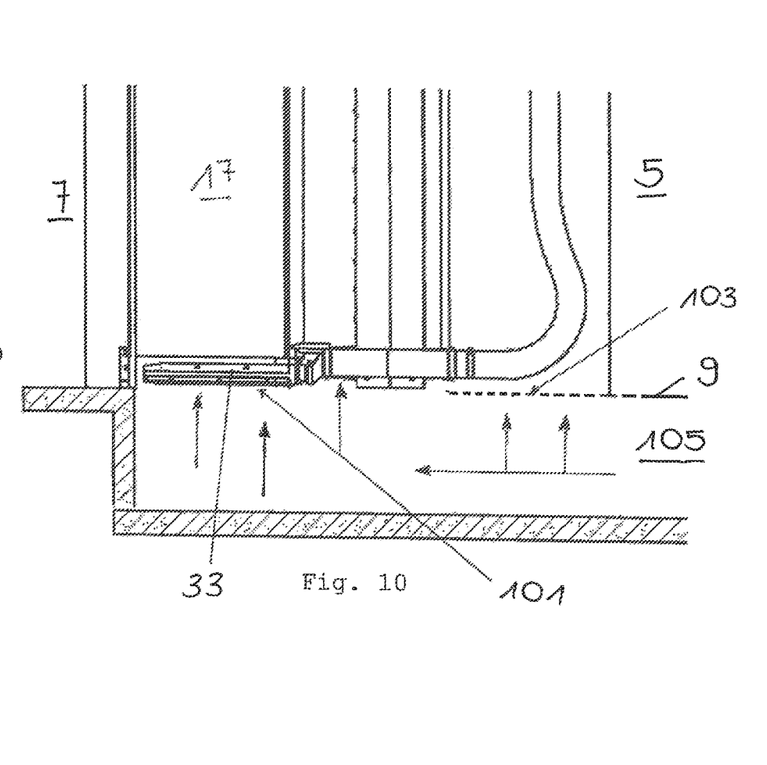
FIG. 10 shows, in a side view, a further embodiment of an air purification plant having an open floor and a floor air duct.

As shown in FIG. 10, a floor air duct 105 which is connected to the dirty-air space 5 moreover may be provided below the dirty-air space 5. The floor air duct 105 in particular serves for supplying the dirty air into the dirty-air space 5. In the case of the shown embodiment the floor air duct 105 is disposed so as to be directly adjoined below the floor area 9, such that the dirty-air space 5 and the floor air duct 105 in the vertical direction are separated from one another merely by the floor area 9 and are interconnected via the floor opening 101 and optionally via further openings 103. The further openings 103 in FIG. 3 are implemented by way of a floor grating. In FIG. 10, the dirty-air supply through the floor opening 101 and through the floor grating 103 is indicated using arrows.

On account of being disposed below the dirty-air space 5, direct supply of the dirty air from a machine room which is not shown and which directly adjoins the dirty-air space 5 is possible, permitting a particularly space-saving arrangement of the air purification plant in an industrial operation.

Figure 11:
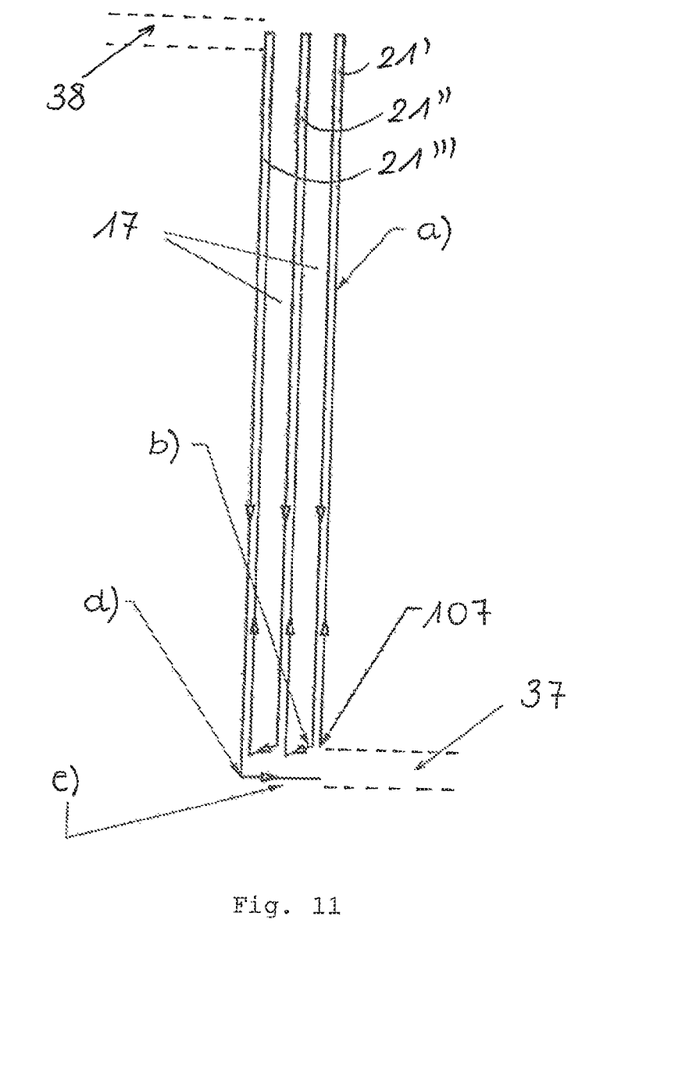
FIG. 11 shows a schematic image of a two-dimensional movement path of the suction nozzle in the course of one cleaning cycle during which all filter pockets are cleaned.

In order to control the movement pattern of the suction nozzle 33 which has been described in the context of FIGS. 1 and 5, the air purification plant 1 comprises a control unit which is disposed on the carriage 29 and which controls the implementation of the following steps which are shown in a schematic manner in FIG. 11. It should be noted here that an initial position 107 below a first filter pocket 21' is assumed to be the starting point for the suction nozzle 33.

a) Activating the vertical drive 77 in order to move the suction nozzle 33 in a filter pocket 21 along the vertical movement path from a lower end position 37 into an upper end position 38 and back again;

b) activating the horizontal drive 43 in order to move forward the suction nozzle 33 upon its return to the lower end position 37, through below the filter box 17 lying therebetween into an adjacent filter pocket 21";

c) repeating steps a) and b) until a last filter pocket 21'" is reached;

d) activating the vertical drive 77 in order to move the suction nozzle 33 in the last filter pocket 21'" along the vertical movement path from the lower end position 37 into the upper end position 38 and back again, e) activating the horizontal drive 43 in order to move back the suction nozzle 33 upon its return to the lower end position 37, below all filter boxes 17 lying therebetween, into the initial position 107 below the first filter pocket 21'.

Within one filter pocket 21 the suction nozzle 33 thus performs at least one vertical upward stroke movement and one vertical downward stroke movement. In the case of each stroke the suction nozzle 33, proceeding from the floor-side lower end position 37, is moved upward into a filter pocket and along the entire height of the filter walls 15 is guided there along. At the end of a cleaning cycle, the suction nozzle 33 below all filter boxes 17 is then moved back into its initial position 107.

It should be mentioned in general terms that in particular in the case of long partition walls the use of not only one cleaning device but a plurality of cleaning devices each having one carriage, one vertical rail, suction nozzle and one horizontal drive and one vertical drive may be meaningful. In this case, each suction nozzle would be assigned a specific number of filter pockets which would in each case be cleaned by said suction nozzle.

The invention claimed is:

1. An air purification plant comprising:
   a partition wall configured for spatial separation of a dirty-air space disposed in an upstream direction of the partition wall from a clean-air space disposed in a downstream direction of the partition wall, the partition wall having a support frame and a plurality of filter boxes projecting from the support frame in the upstream direction, the plurality of filter boxes including at least one filter wall extending from the support frame into the dirty-air space and each filter box of the plurality of filter boxes is open to the clean-air space;
   a plurality of filter walls of adjacent filter boxes of the plurality of filter boxes, the plurality of filter walls facing one another and forming a plurality of filter pockets open in the upstream direction; and
   a filter cleaning installation including:
      a horizontal rail on which a carriage is guided and configured to be movable in a horizontal direction, and
      a vertical rail fastened on the carriage and on which a suction nozzle is connected, the suction nozzle being configured to move in a vertical direction along the vertical rail so as to clean the filter walls of the plurality of filter walls of a corresponding filter pocket of the plurality of filter pockets, the plurality of filter pockets being open on a bottom side, and the suction nozzle being configured to move below a filter box of the plurality of filter boxes that separates two filter pockets of the plurality of filter pockets and switch between the two filter pockets of the plurality of filter pockets.

2. The air purification plant as claimed in claim 1, wherein the filter boxes are exclusively held by the support frame.

3. The air purification plant as claimed in claim 1, wherein when switching from a first filter pocket of the plurality of filter pockets to a second filter pocket of the plurality of filter pockets, the suction nozzle is moved in the vertical direction along the filter pockets and parallel to the horizontal rail below the plurality of filter boxes.

4. The air purification plant as claimed in claim 1, wherein the support frame includes a floor strip joining a lower side of each filter box of the plurality of filter boxes and defining a floor plane from which the plurality of filter boxes are spaced in the vertical direction, the spacing between the filter boxes and the floor plane being greater than a vertical height of the suction nozzle.

5. The air purification plant as claimed in claim 1, wherein the suction nozzle includes a nozzle base and two nozzle side walls perpendicularly projecting from the nozzle base, each nozzle side wall of the two nozzle side walls having a suction opening adjacent to the nozzle base.

6. The air purification plant as claimed in claim 5, wherein:
   the suction nozzle includes two nozzle chambers, each nozzle chamber of the two nozzle chambers having one suction opening, and
   the suction nozzle includes a switchover installation configured to either simultaneously impinge both nozzle chambers of the two nozzle chambers with suction air or alternatingly impinge only one nozzle chamber of the two nozzle chambers with the suction air.

7. The air purification plant as claimed in claim 1, wherein each filter box of the plurality of filter boxes has an external rectangular shape in a plan view or has a shape that tapers toward the upstream direction.

8. The air purification plant as claimed in claim 1, wherein a shape of the suction nozzle in a plan view corresponds to a shape of each filter pocket of the plurality of filter pockets in the plan view.

9. The air purification plant as claimed in claim 1, wherein the plurality of filter boxes are individually replaceable on the support frame where the plurality of filter walls are held.

10. The air purification plant as claimed in claim 1, wherein two or more filter boxes of the plurality of filter boxes are disposed on top of one another in the vertical direction.

11. The air purification plant as claimed in claim 1, wherein the suction nozzle is connected to an endless traction member, the endless traction member being disposed in either (i) an upper end region of the vertical rail and guided about an upper deflection roller or (ii) a lower end region of the vertical rail and guided about a lower deflection roller, and the vertical rail is assigned a vertical drive.

12. The air purification plant as claimed in claim 11, wherein the vertical drive is a reversing electric motor.

13. The air purification plant as claimed in claim 1, further comprising a drive disposed on the carriage, the drive reversibly driving at least one carriage wheel switch to cause horizontal movement of the carriage along the horizontal rail.

14. The air purification plant as claimed in claim 1, wherein the horizontal rail is assigned an encoding rail having one encoding element for each filter pocket of the plurality of filter pockets, and the carriage has a sensor that, upon identification of the encoding element, outputs a signal to stop movement of the carriage along the horizontal rail.

15. The air purification plant as claimed in claim 1, further comprising a control unit configured to control a movement procedure of the suction nozzle proceeding from an initial position below a first filter pocket of the plurality of filter pockets, the movement procedure including:
   a) activating a vertical drive to move the suction nozzle inside the filter pocket of the plurality of filter pockets along the vertical movement path from a lower end position into an upper end position and back again;
   b) activating a horizontal drive to move forward the suction nozzle upon the suction nozzle returning to the lower end position, through below the filter box positioned between the suction nozzle and the lower end position and into a position below an filter pocket of the plurality of filter pockets that is adjacent to the filter box;
   c) repeating steps a) and b) until a last filter pocket of the plurality of filter pockets is reached;
   d) activating the vertical drive in order to move the suction nozzle inside the last filter pocket of the plurality of filter pockets along the vertical movement path from the lower end position into the upper end position and back again; and
   e) activating the horizontal drive in order to move back the suction nozzle upon the suction nozzle returning to the lower end position and below the plurality of filter boxes to the initial position below the first filter pocket of the plurality of filter pockets.

* * * * *